3,006,918
NEW α PYRAZINYL PHENYLACETIC ACID DERIVATIVES WITH CENTRAL DEPRESSANT ACTIVITY AND THEIR MANUFACTURE
David Karel de Jongh, Heemstede, and Antonie M. Akkerman, Hendrik Kofman, and George de Vries, Amsterdam, Netherlands, assignors to N.V. Nederlandsche Combinatie voor Chemische Industrie, Amsterdam, Netherlands, a limited liability company of the Netherlands
No Drawing. Filed July 6, 1959, Ser. No. 824,958
Claims priority, application Netherlands July 5, 1958
9 Claims. (Cl. 260—250)

This invention concerns new substituted phenylacetic acid derivatives with central depresent activity and their manufacture.

The compounds of the present invention have the general formula:

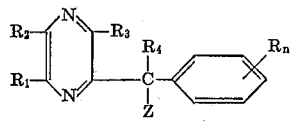

in which $R_1$ and $R_2$ are each selected from the group consisting of hydrogen, loweralkyl radicals and a phenyl radical, $R_3$ is selected from the group consisting of hydrogen and loweralkyl radicals, $R_4$ is selected from the group consisting of hydrogen, loweralkyl, loweralkenyl, loweralkynyl, cycloalkyl, cycloalkenyl, aralkyl, aryl and heteroaromatic radicals, $R_n$ represents one or more substituents selected from the group consisting of hydrogen, halogen, loweralkyl and loweralkoxy radicals, and Z is selected from the group consisting of cyano, carbonamido, carbodialkylamido and carboheteroamido radicals. These compounds are valuable central depressants. Partly they display a sedative action, partly an anticonvulsive activity is found.

It is to be understood that throughout this specification and claims the term "carbodialkylamido" is meant to comprise a carbonamido group in which the nitrogen atom is substituted by two loweralkyl groups, while the term "carboheteroamido" comprises carbonamido groups in which the nitrogen atom is part of a saturated heterocyclic ring. The term "lower" in loweralkyl, loweralkoxy, etc., is meant to comprise hydrocarbon groups which contain from 1 to 5 carbon atoms.

The compounds of the present invention are prepared by interaction of a suitably substituted 2-halopyrazine with the alkali metal compound of a phenylacetonitrile or a phenylacetamide with one of the formulae:

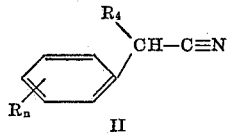

and

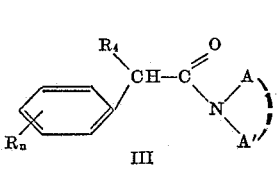

in which $R_4$ and $R_n$ have the above defined meaning, while the symbol

designates a nitrogen atom substituted by two alkyl groups which may or may not be joined to form a saturated heterocyclic ring.

The alkali metal compound may be prepared by interaction of one of the compounds represented by formula II or III with a reactive alkali metal compound, such as an alkali metal amide, oxide or hydride.

In the event that the symbol $R_4$ represents a hydrogen atom, the product obtained above may be reacted anew with a reactive alkali metal compound to form the corresponding alkali metal derivative, which product may react with a loweralkyl, loweralkenyl, loweralkynyl, cycloalkyl, cycloalkenyl, aralkyl, aryl or heteroaromatic halide to form a compound of the Formula I, in which $R_4$ represents a loweralkyl, loweralkenyl, loweralkynyl, cycloalkyl, cycloalkenyl, aralkyl, aryl or heteroaromatic radical.

As an alternative to this method, it is also possible to replace the hydrogen atom $R_4$ by a halogen atom and to react the halide obtained with a suitable alkali or alkaline earth metal compound, such as for instance phenyllithium, an alkylmagnesium halide, etc.

The above reactions should be carried out in a dry inert medium such as benzene or toluene. Sometimes it is preferable, however, to use liquid ammonia as a reaction medium.

The nitriles corresponding to Formula I may be saponified in a known manner to yield the corresponding carbonamides.

The following examples serve to illustrate the invention. All temperatures are given in degrees centigrade. The melting points are all uncorrected.

*Example 1*

While stirring a suspension of 11.7 grams (0.3 mole) of sodium amide in 40 cc. of dry toluene at room temperature a solution of 38.8 grams (0.2 mole) of diphenylacetonitrile in 75 cc. of dry toluene is gradually added. The mixture is refluxed for two hours under continuous stirring. After cooling to about 70° 34.8 grams (0.3 mole) of 2-chloropyrazine are quickly and dropwise added and the mixture is again heated while stirring, now refluxing for 3–5 hours. After cooling 6 cc. of methanol followed by 10 cc. of water are added and this mixture is extracted several times with concentrated hydrochloric acid. The aqueous layer is extracted several times with benzene in order to remove non-basic components and then concentrated by evaporation under reduced pressure. After dilution the solution is made alkaline with sodium carbonate, yielding crystals of α,α-diphenyl 2-pyrazineacetonitrile, which are filtered. By recrystallization from methanol the product can be obtained in pure form. The melting point amounts to 100°–102°.

*Example 2*

While stirring a suspension of 11.7 grams (0.3 mole) of sodium amide in 40 cc. of dry toluene at room temperature a solution of 57.9 grams (0.3 mole) of diphenylacetonitrile in 150 cc. of dry toluene is added. The mixture is refluxed for two hours under continuous stirring. After cooling to about 70° 28.5 grams (0.2 mole) of 3-chloro-2-ethylpyrazine are quickly and dropwise added and the mixture is again heated while stirring, now refluxing for 3–5 hours. After cooling 6 cc. of methanol followed by 10 cc. of water are added and this mixture is shaken with concentrated hydrochloric acid until the mass obtained is completely divided between the aqueous and the organic layer. The aqueous layer is further diluted with water, thereby precipitating α,α-diphenyl-3-ethyl 2-pyrazineacetonitrile crystals. These crystals are filtered and recrystallized from methanol, yielding a pure product with melting point 118°–121°.

Example 3

While stirring a suspension of 11.7 grams (0.3 mole) of sodium amide in 40 cc. of dry toluene at room temperature a solution of 57.9 grams (0.3 mole) of diphenylacetonitrile in 150 cc. of dry toluene is added. The mixture is refluxed for two hours under continuous stirring. After cooling to about 70° 39.9 grams (0.28 mole) of 2-chloro-5,6-dimethylpyrazine are quickly and dropwise added and the mixture is again heated while stirring, now refluxing for 3–5 hours. After cooling 6 cc. of methanol followed by 10 cc. of water are added and this mixture is extracted with concentrated hydrochloric acid. A precipitate is formed which is filtered and treated with water to yield 5,6-dimethyl-α,α-diphenyl 2-pyrazineacetonitrile. Recrystallization from methanol yields a pure product with melting point 130.5°–132°.

Example 4

In the same way as described in Example 3, using 0.28 mole of 2-chloro-5,6-diphenylpyrazine instead of the 2-chloro-5,6-dimethylpyrazine above, 5,6,α,α-tetraphenyl 2-pyrazineacetonitrile, M.P. 192°–194°, is obtained.

Example 5

While stirring a suspension of 39 grams (1 mole) of sodium amide in 500 cc. of dry benzene 117 grams (1 mole) of phenylacetonitrile are added in the course of 30 minutes. The mixture is refluxed for 45 minutes under continuous stirring. At the boiling temperature 50 grams (0.346 mole) of 2-chloropyrazine are added in the course of 30 minutes and thereupon the mixture is refluxed for another 3 hours. After cooling 20 cc. of methanol followed by 30 cc. of water are added and this mixture is extracted several times with 30–36 percent hydrochloric acid. The aqueous layer is diluted with water and extracted with chloroform. This chloroform solution is dried and the solvent is evaporated. The α-phenyl 2-pyrazineacetonitrile obtained is purified by recrystallization from methanol, yielding a product with M.P. 132°–133°.

Example 6

While stirring a suspension of 18.7 grams (0.48 mole) of sodium amide in 100 cc. of dry dioxane at room temperature a warm solution of 90 grams (0.4 mole) of 4-methoxydiphenylacetonitrile in 400 cc. of dioxane is added. The mixture is refluxed for three hours under continuous stirring. After cooling to about 50° 55.2 grams (0.48 mole) of 2-chloropyrazine are quickly and dropwise added and the mixture is again heated while stirring, now refluxing for two and a half hours. After cooling 16 cc. of methanol followed by 10 cc. of water are added. This mixture is diluted with three times its volume of water. The oil which separates crystallizes and the crystals are filtered and then purified by dissolving in toluene and extraction of this solution with concentrated hydrochloric acid. On diluting the aqueous phase with water the α-(4-methoxyphenyl)-α-phenyl 2-pyrazineacetonitrile separates in crystalline form and is further purified by recrystallization from methanol, yielding a product with melting point 105°–108°.

Example 7

While stirring a suspension of 18.7 grams (0.48 mole) of sodium amide in 100 cc. of dry toluene at room temperature a solution of 91.2 grams (0.4 mole) of 4-chlorodiphenylacetonitrile in 150 cc. of dry toluene is added. The mixture is refluxed for three hours under continuous stirring. After cooling to about 50° 55.2 grams (0.48 mole) of 2-chloropyrazine are quickly and dropwise added and the mixture is again heated while stirring, now refluxing for two and a half hours. After cooling 16 cc. of methanol followed by 10 cc. of water are added. The solution obtained is mixed with concentrated hydrochloric acid. An oil separates, which does not dissolve in either of the layers present. On treatment with water this oil yields the α-(4-chlorophenyl)-α-phenyl 2-pyrazineacetonitrile in crystalline form, which melts after recrystallization from methanol at 105°–108°.

Example 8

In the same way as described in Example 7, using 0.3 mole of 4-fluorodiphenylacetonitrile instead of the 4-chlorodiphenylacetonitrile above, α-(4-fluorophenyl)-α-phenyl 2-pyrazineacetonitrile, M.P. 83°–84°, is obtained.

Example 9

In the same ways as described in Example 7, using 0.3 mole of α-phenyl-α-(2-thienyl)acetonitrile instead of the 4-chlorodiphenylacetonitrile above, α-phenyl-α-(2-thienyl) 2-pyrazineacetonitrile, M.P. 78°–79°, is obtained.

Example 10

In the same way as described in Example 6, using 0.3 mole of α-cyclohexyl-α-phenylacetonitrile instead of the 4-methoxydiphenylacetonitrile above, α-cyclohexyl-α-phenyl 2-pyrazineacetonitrile is obtained. The compound appears in two allotropic forms, melting at 103°–104° and at 144°.

Example 11

While stirring a suspension of 10.8 grams (0.275 mole) of sodium amide in 40 cc. of dry dioxane a warm solution of 49 grams (0.25 mole) of α-phenyl 2-pyrazineacetonitrile in 150 cc. of dioxane is added. The mixture is refluxed for four hours under continuous stirring. After cooling to about 15° a solution of 39 grams (0.275 mole) of methyl iodide in 25 cc. of dioxane is quickly added and the mixture is thereupon heated for one hour at 85°. The reaction mixture is poured in water and extracted several times with chloroform. The combined chloroform layers are twice extracted with water, dried and the chloroform is evaporated. The α-methyl-α-phenyl 2-pyrazineacetonitrile obtained is purified by distillation. The compound boils at 150°–156° under a pressure of 1 mm. of mercury and shows a refractive index $n_D^{20}=1.5743$.

Example 12

In the same way as described in Example 11, using 0.275 mole of ethyl iodide instead of the methyl iodide above, and refluxing the mixture after addition of the ethyl iodide for two hours, α-ethyl-α-phenyl 2-pyrazineacetonitrile, M.P. 45°–47°, is obtained.

Example 13

In the same way as described in Example 11, using 0.275 mole of n-propyl bromide instead of the methyl iodide above, and refluxing the mixture after addition of the n-propyl bromide for 18 hours, α-(n-propyl)-α-phenyl 2-pyrazineacetonitrile, M.P. 66°–68°, is obtained.

Example 14

In the same way as described in Example 11, using 0.275 mole of iso-propyl bromide instead of the methyl iodide above, and refluxing the mixture after the addition of the iso-propyl bromide for 72 hours, α-iso-propyl-α-phenyl 2-pyrazineacetonitrile, M.P. 56°–58°, is obtained.

Example 15

In the same way as described in Example 11, using 0.275 mole of benzyl chloride instead of the methyl iodide above, and refluxing the mixture after addition of the benzyl chloride for two hours, α-(α'-benzyl)-α-phenyl 2-pyrazineacetonitrile, M.P. 71–75°, is obtained.

Example 16

In the same way as described in Example 11, using 0.275 mole of cyclohexyl bromide instead of the methyl iodide above, and refluxing the mixture after the addition of the cyclohexyl bromide for 72 hours, α-cyclohexyl-α- phenyl 2-pyrazineacetonitrile is obtained, which compound is identical with that obtained according to Example 10.

*Example 17*

In the same way as described in Example 11, using 0.275 mole of allyl chloride instead of the methyl iodide above, and refluxing the mixture after the addition of the allyl chloride for 15 hours, α-phenyl-α-(propene-2) 2-pyrazineacetonitrile, M.P. 47.50–49.5°, is obtained.

*Example 18*

In the same way as described in Example 11, using 0.25 mole of α-(4-chlorophenyl) 2-pyrazineacetonitrile instead of the α-phenyl 2-pyrazineacetonitrile above, α-(4-chlorophenyl)-α-methyl 2-pyrazineacetonitrile is obtained, which on recrystallization from methanol yields a pure product with M.P. 70°–71°.

*Example 19*

To 150 cc. of concentrated sulphuric acid at a temperature of 90° 25.0 grams (0.128 mole) of α,α-diphenyl 2-pyrazineacetonitrile are added with stirring. After heating the solution for twelve hours at 90° it is cooled and poured out on ice. Thereupon the solution is neutralized with sodium carbonate and filtered. The product on the filter is washed several times with water to dissolve the inorganic salts and thereupon dried in a vacuum. Recrystallization from methanol yields pure α,α-diphenyl 2-pyrazineacetamide with a melting point of 200°–201°.

*Example 20*

To 100 cc. of concentrated sulphuric acid 19.5 grams (0.1 mole) of α-phenyl 2-pyrazineacetonitrile are added at room temperature. After standing for forty hours the solution is poured on ice and neutralized with sodium bicarbonate. The precipitate is filtered and washed with chloroform; the filtrate is extracted several times with chloroform and the combined chloroform solution is dried and the chloroform is evaporated. The product is recrystallized from benzene yielding pure α-phenyl 2-pyrazine-acetamide with a melting point of 162°–164°.

*Example 21*

A solution of 20 grams (0.0965 mole) of α-methyl-α-phenyl 2-pyrazineacetonitrile in 100 cc. of concentrated sulphuric acid is heated at 90° for 19 hours. Thereafter it is allowed to cool and then poured on ice. The solution obtained is neutralized with ammoniumcarbonate and the precipitate formed is collected on a filter and dried. Recrystallization from benzene yields pure α-methyl-α-phenyl 2-pyrazineacetamide with a melting point of 131°–133°.

*Example 22*

In the same way as described in Example 21, using 0.1 mole of α-ethyl-α-phenyl 2-pyrazineacetonitrile, however, α-ethyl-α-phenyl 2-pyrazineacetamide, M.P. 87°–89°, is obtained.

*Example 23*

In the same way as described in Example 21, using 0.1 mole of α-(n-propyl)-α-phenyl 2-pyrazineacetonitrile, however, α-(n-propyl)-α-phenyl 2-pyrazineacetamide, M.P. 92°–95°, is obtained.

*Example 24*

Under cooling with tap water, a mixture of 161 grams (1.23 moles) of 4-methylbenzylcyanide and 110 grams (2.82 moles) of sodium amide in 2½ litres of dry benzene is stirred in a nitrogen atmosphere. When the reaction has substided the mixture is heated and kept at 50° for 15 minutes. While cooling again, 150 grams (1.31 moles) of 2-chloropyrazine are dropwise added, keeping the temperature below about 35° during this addition. When all of the 2-chloropyrazine is added the mixture is heated and kept at 45°–50° for 30 minutes. The mixture is allowed to cool and then 120 cc. of methanol followed by 250 cc. of 4 N hydrochloric acid are dropwise added, keeping the temperature below 30°. The benzene solution is washed with water and concentrated to a volume of about 750 cc. On cooling crystals of α-(4-methylphenyl) 2-pyrazineacetonitrile are obtained, which yield a pure product on recrystallization from methanol with M.P. 123°–125°.

*Example 25*

In the same way as described in Example 24, using 4-methoxybenzylcyanide instead of the 4-methylbenzylcyanide above, α-(4-methoxyphenyl) 2-pyrazineacetonitrile, M.P. 136°–138°, is obtained.

*Example 26*

In the same way as described in Example 24, using 4-chlorobenzylcyanide instead of the 4-methylbenzylcyanide above, and recrystallizing the product from ethanol, α-(4-chlorophenyl) 2-pyrazineacetonitirile, M.P. 110°–111°, is obtained.

*Example 27*

In the same way as described in Example 24, using 4-fluorobenzylcyanide instead of the 4-methylbenzylcyanide above, and recrystallizing the product from a mixture of benzene and petroleum ether after treatment with decolourizing carbon, α-(4-fluorophenyl) 2-pyrazineacetonitrile, M.P. 99.5°–101°, is obtained.

*Example 28*

3.5 grams (0.012 mole) of α-(4-methylphenyl) 2-pyrazineacetonitrile are dissolved in 35 grams of concentrated sulphuric acid at room temperature. After standing overnight the solution is poured on ice and the solution obtained is diluted with water and then neutralized with solid ammonium carbonate. The precipitate obtained is filtered and the filtrate is extracted with chloroform. The residue resulting after evaporation of the chloroform is combined with the precipitate and together they are recrystallized from water or benzene, using decolourizing carbon. The pure α-(4-methylphenyl) 2-pyrazineacetamide obtained melts at 138°–139°.

*Example 29*

In the same way as described in Example 28, using α-(4-chlorophenyl) 2-pyrazineacetonitrile instead of the α-(4-methylphenyl) 2-pyrazineacetonitrile above, α-(4-chlorophenyl) 2-pyrazineacetamide, M.P. 149.5°–150.5°, is obtained.

*Example 30*

In the same way as described in Example 28, using α-(4-fluorophenyl) 2-pyrazineacetonitrile instead of the α-(4-methylphenyl) 2-pyrazineacetonitrile above, α-(4-fluorophenyl) 2-pyrazineacetamide is obtained, which on recrystallization from benzene melts at 136.5°–137.5°.

*Example 31*

In the same way as described in Example 28, using α-methyl-α-(4-methylphenyl) 2-pyrazineacetonitrile instead of the α-(4-methylphenyl) 2-pyrazineacetonitrile above, α-methyl-α-(4-methylphenyl) 2-pyrazineacetamide, M.P. 151°, is obtained after recrystallization from benzene.

*Example 32*

In the same way as described in Example 28, using α-(4-chlorophenyl)-α-methyl 2-pyrazineacetonitrile instead of the α-(4-methylphenyl) 2-pyrazineacetonitrile above, α-(4-chlorophenyl)-α-methyl 2-pyrazineacetamide, M.P. 152.5°–153.5°, is obtained.

*Example 33*

While stirring a suspension of 7.8 grams (0.2 mole) of sodium amide in 30 cc. of dry benzene in a nitrogen atmosphere, a solution of 18.9 grams (0.1 mole) of phenylacetpyrrolidide in 10 cc. of dry benzene is gradually added. The mixture is heated and kept at 75° for 30 minutes. After cooling to 50° a solution of 11.4 grams (0.1 mole) of 2-chloropyrazine in 20 cc. of dry benzene is dropwise added and the mixture is refluxed for 1½ hours. After cooling externally with ice water, 15 cc. of methanol followed by 50 cc. of 4 N hydrochloric acid are dropwise added. On further addition of water and benzene the mixture is made weakly alkaline with ammonia and the benzene layer is separated. This benzene solution is concentrated to some extent and then filtered through a column of 50 grams of aluminum oxide. The column is washed with benzene. The filtrate is concentrated to a volume of 60 cc. and poured out in 600 cc. of hot isopropylether. On cooling the α-phenyl 2-pyrazineacetpyrrolidide crystallizes. Recrystallization from isopropylether yields a product with melting point 118°–120°.

*Example 34*

In the same way as described in Example 33, using 0.1 mole of N,N-dimethyl phenylacetamide instead of the phenylacetpyrrolidide above, N,N-dimethyl-α-phenyl 2-pyrazineacetamide is obtained, which on recrystallization from a mixture of acetone and petroleum ether yields a pure product with M.P. 111°–113°.

*Example 35*

In the same way as described in Example 33, using 0.1 mole of N,N-diethyl phenylacetamide instead of the phenylacetpyrrolidide above, N,N-diethyl-α-phenyl 2-pyrazineacetamide is obtained, which on recrystallization from a mixture of isopropylether and petroleum ether yields a pure product with M.P. 71°–73°.

*Example 36*

A mixture of 21 grams (0.1 mole) of α-(4-methylphenyl) 2-pyrazineacetonitrile, 4.07 grams (0.11 mole) of sodium amide and 200 cc. of dry benzene is heated for one hour with stirring. Thereupon 10 cc. of methyl iodide are added and the mixture is stirred at room temperature for 1½ hours and then heated to 45° and kept at that temperature for 30 minutes. The resulting solution is washed with 10 cc. of sodium hydroxide solution and thereafter with water, is concentrated to some extent and filtered through an aluminum oxide column. The filtrate is evaporated and the residue is distilled under reduced pressure, boiling at 170°–171° at 2 mm. mercury. The product obtained is α-methyl-α-(4-methylphenyl) 2-pyrazineacetonitrile.

*Example 37*

A mixture of 1 gram (0.0044 mole) of α-(4-methoxyphenyl) 2-pyrazineacetonitrile and 6 cc. of concentrated hydrochloric acid is stirred for 24 hours at room temperature. Thereafter the mixture is poured on ice and the solution obtained is extracted with chloroform. The residue resulting after evaporation of the chloroform is recrystallized from water or from a mixture of benzene and petroleum ether. The α-(4-methoxyphenyl) 2-pyrazineacetamide obtained melts at 124°–126°.

*Example 38*

To 300 cc. of liquid ammonia 23 grams (1 mole) of sodium are added and to the resulting sodium amide suspension a solution of 89 grams (0.5 mole) of 3,4-dimethoxyphenylacetonitrile and 69 grams (0.6 mole) of 2-chloropyrazine in a mixture of 250 cc. of ether and 300 cc. of dioxane is gradually added in the course of 1½ hours while stirring and cooling the solution to temperatures below about −40°. For another 30 minutes the mixture is cooled, and then the temperature is allowed to rise to room temperature. After standing overnight the mixture is heated and kept at 40° for half an hour. Thereafter it is cooled with ice, and 32 cc. of methanol, followed by 20 cc. of water are added. During all these operations the mixture is stirred. The reaction mixture obtained is poured in 2 litres of water and extracted several times with chloroform. The combined chloroform extracts are washed twice with a little water, dried over magnesium sulphate, and then the chloroform is evaporated. The residue is recrystallized from methanol or petroleum ether, yielding pure α-(3,4-dimethoxyphenyl) 2-pyrazineacetonitrile with M.P. 124°–126°.

*Example 39*

In the same way as described in Example 11, using 0.275 mole of propargyl bromide instead of the methyl iodide above, α-phenyl-α-propargyl 2-pyrazineacetonitrile, M.P. 96.5°–98.5°, is obtained.

What we claim is:

1. The compound α-methyl-α-phenyl 2-pyrazineacetonitrile.
2. The compound α-methyl-α-phenyl 2-pyrazineacetamide.
3. The compound α-phenyl-α-(2-propenyl) 2-pyrazineacetonitrile.
4. The compound α-phenyl-α-(2-propynyl) 2-pyrazineacetonitrile.
5. The compound α-(3,4-dimethoxyphenyl) 2-pyrazineacetonitrile.
6. A substituted phenylacetic acid derivative having the formula:

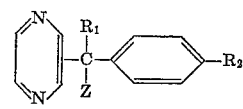

in which $R_1$ is selected from the group consisting of hydrogen, loweralkyl-, loweralkenyl- and loweralkynyl- radicals, $R_2$ is selected from the group consisting of hydrogen, chloro-, fluoro- and loweralkoxy radicals, the term "lower" meaning having not more than 5 carbon atoms, and Z is selected from the group consisting of cyano and unsubstituted carbonamido.

7. A method of preparing substituted phenylacetic acid derivatives comprising the steps of reacting sodium amide with a compound selected from the group consisting of phenylacetonitriles and phenylacetamides having the formulae:

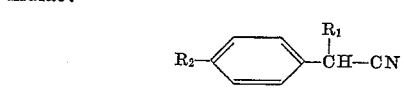

and

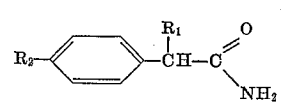

where $R_1$ is selected from the group consisting of hydrogen, loweralkyl-, loweralkenyl- and loweralkynyl-radicals and $R_2$ is selected from the group consisting of hydrogen, chloro-, fluoro- and loweralkoxy-radicals, the term "lower" meaning having not more than 5 carbon atoms, and interacting the thus obtained sodium compound with 2-halopyrazine.

8. A method as in claim 7; wherein $R_1$ represents a hydrogen atom; and further comprising the steps of reacting sodium amide with the product of the interaction of said sodium compound with the 2-halopyrazine to form the corresponding sodium derivative, and then reacting said sodium derivative with a substance selected from the group consisting of loweralkyl, loweralkenyl and loweralkynyl halides, the term "lower" meaning having not more than 5 carbon atoms.

9. A method as in claim 7; wherein said reactions are carried out in a dry inert medium selected from the group consisting of benzene, toluene, dioxane and liquid ammonia.

No references cited.